United States Patent

Kaye et al.

[15] 3,673,593

[45] June 27, 1972

[54] STYLUS ASSEMBLY FOR ELECTRICALLY RECORDING OF INFORMATION

[72] Inventors: George W. Kaye, Malverne; John R. Shonnard, East Setauket, both of N.Y.

[73] Assignee: Litton Systems, Inc., Beverly Hills, Calif.

[22] Filed: Jan. 13, 1970

[21] Appl. No.: 2,541

[52] U.S. Cl. ..........................346/74 ES, 346/74 E, 346/74 S, 346/139 C

[51] Int. Cl. ..................................G01d 15/06, G01d 15/16

[58] Field of Search .................346/74 ES, 74 E, 74 S, 74 SB, 346/74 SC, 74 CH, 139 C; 101/DIG. 13

[56] References Cited

UNITED STATES PATENTS

| | | | |
|---|---|---|---|
| 2,943,908 | 7/1960 | Hanna | 178/6.6 A |
| 3,112,358 | 11/1963 | Ueno | 346/101 |
| 2,575,742 | 11/1951 | Baltin et al. | 346/139 C |
| 1,915,426 | 6/1933 | Kohler | 346/139 C |

*Primary Examiner*—Bernard Konick
*Assistant Examiner*—Gary M. Hoffman
*Attorney*—Alan C. Rose, John G. Mesaros and Alfred B. Levine

[57] ABSTRACT

Apparatus for electrically recording information on a recording sheet or web having a dielectric charge-retaining surface comprising a ball-tipped stylus in contact with the sheet or web. Signal potentials applied to the stylus produce a charge pattern on the sheet or web which may be developed by a suitable toner. The ball in the tip of the stylus maintains uniform contact with the surface of the recording sheet or web and insures satisfactory recording over an extended period of use.

3 Claims, 3 Drawing Figures

STYLUS ASSEMBLY FOR ELECTRICALLY RECORDING OF INFORMATION

BACKGROUND OF THE INVENTION

The invention relates to electric recorders employing electric signals or pulses to record graphic material, physical symbols or the like, as in the facsimile recorder. The information pulses are applied to a recording medium having a charge-retaining surface, to form a charge pattern thereon representing the desired record.

In electric recording with an energized stylus, it has been proposed to use a wire or pin stylus in contact with the recording surface as shown for example in U.S. Pat. No. 2,919,170, granted to H. Epstein, Dec. 29, 1959.

It has also been proposed to effect electrostatic recording with a field discharge between an electrode and the spaced insulating recording surface as shown for example in U.S. Pat. No. 3,064,259 granted to F. A. Schwertz, Nov. 13, 1962. These recording systems have certain drawbacks which are overcome by the present invention.

SUMMARY OF THE INVENTION

In accordance with the invention, a stylus is used to form a charge pattern on a recording sheet or web having a dielectric charge-retaining surface, as distinguished from xerography in which a charged photoconductive layer is selectively dissipated by a pattern of light and shadow to be recorded. The stylus consists of a hollow stem and a spring-loaded ball at the tip end of the stylus to maintain uniform contact with the surface of the sheet or web. The spring bearing against the contact ball insures good electrical contact providing a low-resistance connection with the source of electrical signals to be recorded. In a multiple stylus facsimile recorder, the rigidity of the stylus insures accurate tracking of the styluses to provide satisfactory recording.

It is an object of the present invention to provide a stylus construction for forming a charge pattern on a recording sheet or web which maintains uniform contact with the sheet or web for an extended period of use, eliminates the deleterious effects of stylus bounce and avoids accumulation of dirt or lint on the stylus tip.

Another object of the invention is to overcome the difficulties encountered with the prior wire stylus which wears rapidly, is weak and easily bent during use, and the contact area at the tip of the stylus varies as the recording proceeds which degrades the quality of recording.

The attainment of these and other objectives will be explained in the following description of a preferred embodiment of the invention.

DESCRIPTION OF THE PREFERRED EMBODIMENT

The recording apparatus according to the invention uses a coated paper having an insulating or dielectric charge-retaining surface. A charge pattern is formed on the sheet by applying electric charges with an energized stylus in contact with the sheet and the pattern is then developed and fixed in the conventional manner to form a visible record of the trace, symbol or image. While the apparatus may be embodied in chart recorders or the like, it is of particular value in facsimile recorders where one or more styluses are traversed rapidly across the width of a recording sheet or web. In such recorders accurate positioning of the tip of such stylus is a prime requirement. It is also important from a practical standpoint to employ a stylus construction which can be used over an extended period, for several thousand hours or more for example, and does not require frequent adjustment or replacement.

Figure 1:
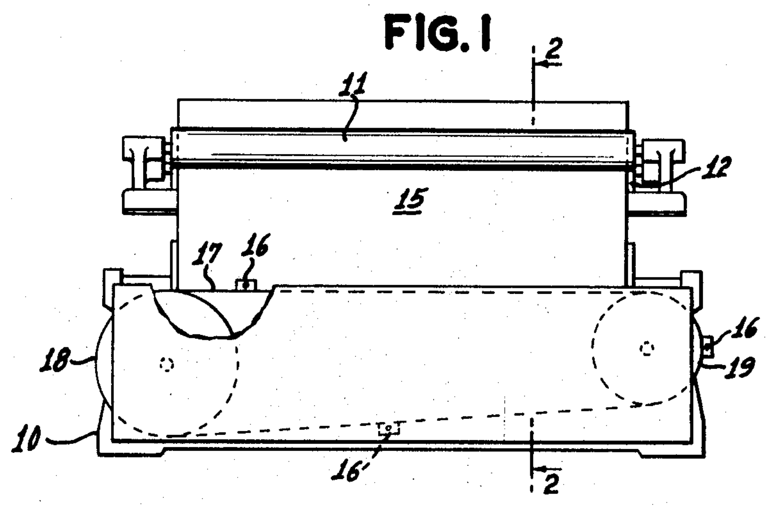
FIG. 1 is a front elevational view of a facsimile recorder embodying the invention.
Figure 2:
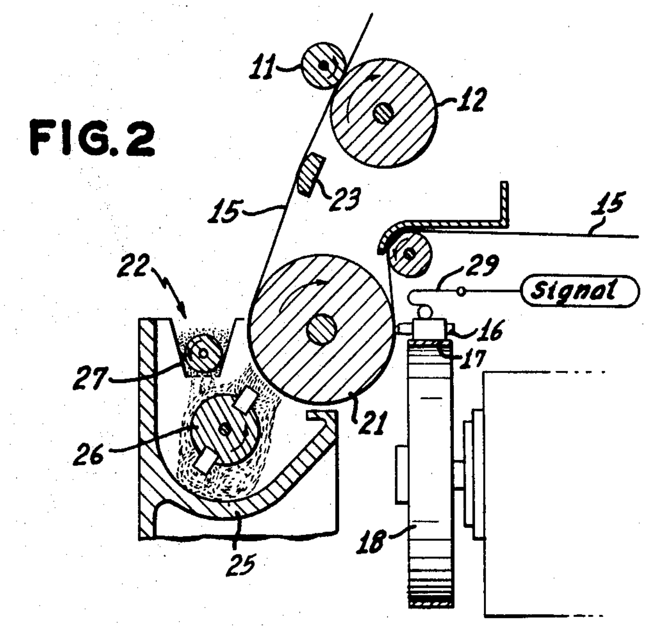
FIG. 2 is a partial cross section taken on the line 2—2 of FIG. 1, showing the structural details of the recording assembly.

FIG. 1 shows by way of example a facsimile recorder employing the novel stylus construction and comprising a frame 10 having means such as feed rollers 11 and 12 for advancing a recording sheet or web 15 from a supply roll (not shown) through the recording assembly. The recording assembly includes a novel ball tipped stylus 16 which is traversed across the width of the sheet 15. As shown the stylus 16 is mounted upon a travelling belt 17 carried by spaced wheels or pulleys 18 and 19. In a facsimile recorder of this type, the movement of the belt 17 is synchronized with the scanning assembly of a remote transmitter. In the construction shown three equally spaced styluses 16 are used in order to obtain continuous contact between one of the styluses and the surface of the sheet or web 15. The driving motor, phasing and control elements of the recorder are not shown as they form no part of the present invention and are well known in the art. Obviously the invention may be used in other types of electric recorders where marking is effected by an energized recording point or stylus.

Instead of the light-sensitive or electrosensitive recording material commonly employed in facsimile recording apparatus, the conductive stylus 16 is used to charge elemental areas on a sheet or web of electrographic material having a charge-retaining surface. The latent image thus produced can be developed and fixed as in the usual electrographic or xerographic process. In the specific embodiment shown by way of example the recording sheet 15 is fed over a metallic drum or support 21 adjacent to the stylus 16, through toning means 22 and over a heater bar 23 to fuse the toner in the areas where it adheres to the surface of the sheet 15. The specific toning means shown by way of example comprises a reservoir 25 containing coated carrier mix and toner, a rotating agitator or magnetic brush 26, and a receptacle 27 having a perforated bottom for replenishing the reservoir 25. The source of signals to be recorded is shown as connected to the stylus 16 through a contact or brush 29.

Figure 3:
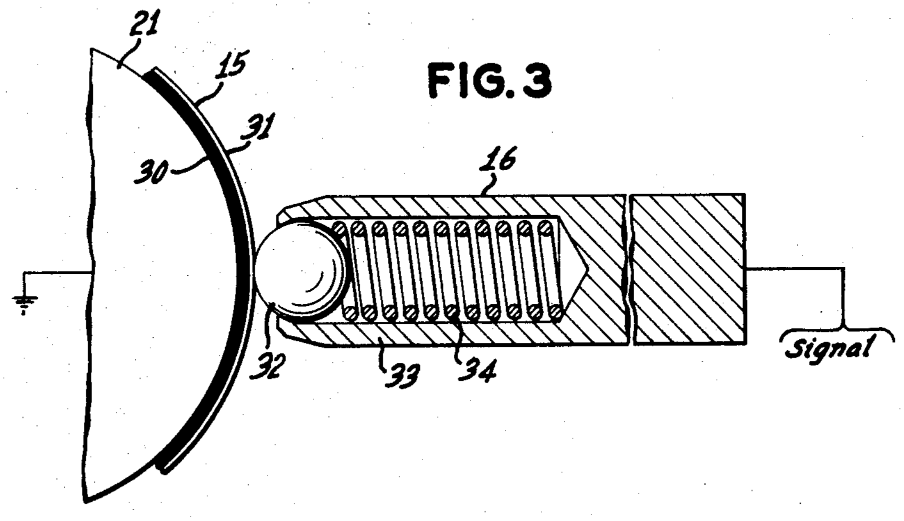
FIG. 3 is a detail view showing the stylus assembly to an enlarged scale.

As shown in FIG. 3, the sheet or web 15 may comprise a conductive base 30 coated with an insulating or dielectric coating 31. In one aspect, the invention resides in a novel stylus consisting of a spring-pressed ball 32 in a hollow metal stem 33, urged into contact with the charge-retaining coating 31 of the recording sheet 15 by a spring 34 which also provides a low-resistance connection between the ball 32 and the stem 33 connected to the signal input as shown. The diameter of the ball 32 typically would be approximately 0.040 inches, and the ball made of tungsten carbide or other wear-resistant conductive metal or alloy. The stiffness of the stem 33 insures rigid positioning of the point of contact between the stylus 16 and the recording sheet 15.

During recording, the contact ball 32 rotates due to its frictional contact with the sheet which distributes the wear and provides much longer life than that of the conventional pin or wire stylus. The presence of dirt or lint at the point of contact which would affect the recording is avoided. Furthermore the compliance of the spring-loaded ball enables the stylus to ride over any irregularity in the surface of the recording sheet and this, together with the lateral stiffness of the stylus assembly, maintains the precise position of the recording tip (contact area of the ball 32) which is necessary for the best recording results. In actual practice the ball-tipped stylus is found to have a much longer life than the wire stylus, and to provide superior recording quality. It is simpler than the space discharge or ionizing electrode, which also may puncture the dielectric surface coating and has the drawback that the effective charging area is difficult to control. Thus while the recording apparatus of the present invention offers particular advantages in facsimile recorders, it may advantageously be used in other types of electric recorders.

What is claimed is:

1. Apparatus for electrically recording information on a recording web having a dielectric charge-retaining surface, comprising:

a stylus disposed in contact with the recording web, consisting of a hollow rigid stem having a reduced tip portion, a conductive ball rotatably mounted in said stem at said reduced tip portion, and a spring in said stem for retaining the ball in a position free to float longitudinally within said hollow stem away from said reduced tip portion and free to roll against said reduced tip portion of said stem and against said recording web thus providing electrical connection between said stem and said ball while allowing said floating-rolling ball to be self-cleaning in said stem, means to apply marking signal potential to said stylus to produce a charged area on the charge-retaining surface of said recording web, and toner means to develop the image represented by said charged area.

2. A facsimile recorder, comprising:

a recording web having a dielectric charge-retaining surface, a recording assembly, means for advancing said recording web through said recording assembly, said recording assembly comprising a plurality of styluses and means for traversing the same across the width of said recording web, each of said styluses comprising a hollow rigid stem partially enclosing a spring-loaded conductive ball at the tip end thereof such that said ball is free to float within said hollow rigid stem away from said partially enclosed stylus tip and free to roll with respect to said partially enclosed stylus tip end as each of said styluses traverse said recording web for providing self-cleaning between said ball and said stylus tip end and providing low friction contact between said ball and said recording web, and means to apply electric signal pulses to said styluses to product a pattern of charged areas on the charge-retaining surface of said recording web representing the facsimile record information.

3. Apparatus for electrically recording information on a charge-retaining web surface having stylus means, means for producing relative movement between said stylus means and said web surface, means for applying electrical potentials to said stylus for charging discrete areas of said web surface, and means for treating said discrete areas to produce an image upon said web surface, wherein the improvement comprises:

said stylus having a tubular tip;

spring means within said tubular tip;

ball means urged within said tubular tip against said spring means;

said tubular tip having the outermost end thereof reduced in cross-section to partially enclose and capture said ball means urged against said enclosed end by said spring means; and said tip, spring and ball means being electrically conductive wherein said ball makes electrical-rolling contact with said web surface while being free to float longitudinally within said tubular tip away from said reduced outermost end of said tubular tip over irregularities in said web surface, said rolling-floating motion thus preventing the accumulation of dirt between said ball means and said end of said stylus tip.

* * * * *